July 1, 1952 E. BRICHARD 2,601,929
APPARATUS FOR LOADING AND CONVEYING GLASS SHEETS
Filed March 28, 1946
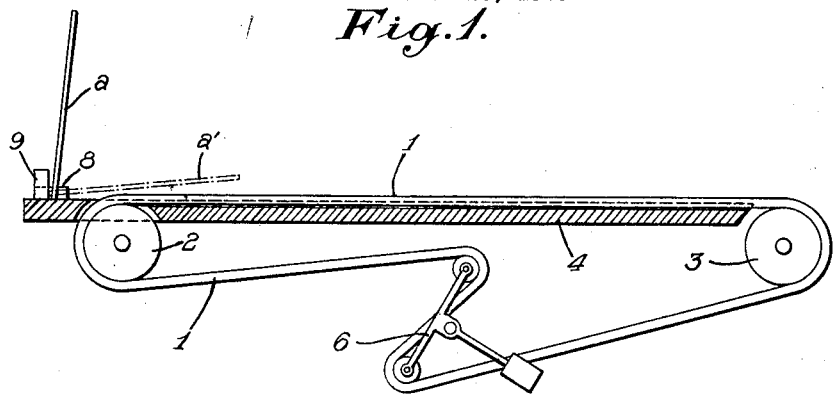
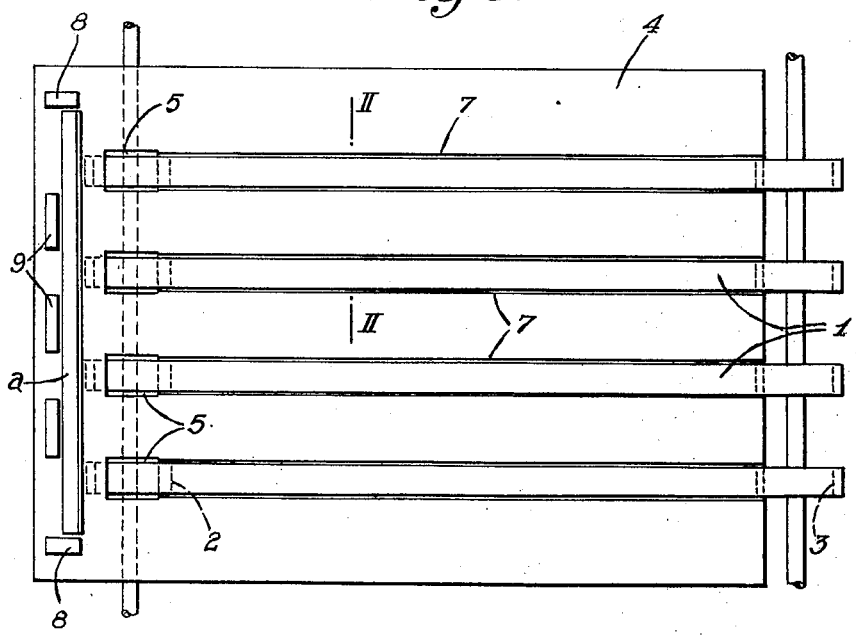
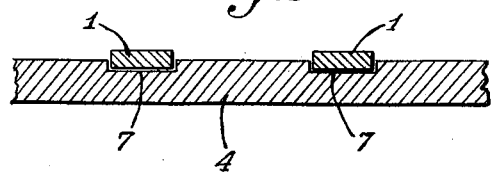
Inventor
EDGARD BRICHARD
By Haseltine, Lake & Co.
Attorneys Patented July 1, 1952

2,601,929

UNITED STATES PATENT OFFICE 2,601,929

APPARATUS FOR LOADING AND CONVEYING GLASS SHEETS

Edgard Brichard, Jumet, Belgium, assignor to Union Des Verreries Mecaniques Belges, S. A., Charleroi, Belgium, a Belgian company Application March 28, 1946, Serial No. 657,773
In Belgium April 25, 1945

3 Claims. (Cl. 214—1)

The present invention relates to apparatus for conveying glass sheets along a rectilinear path in their own plane and its primary object is to allow of rapidly charging such sheets in an exactly defined position while avoiding causes for breakage of the glass.

In order rapidly to lay glass sheets on a substantially horizontal table, workmen are used to stand the sheet on edge almost vertically and to let it fall forwards, its fall then being dampened by the air cushion which is compressed under the sheet at the moment it is going to touch the table and persists until all the air has escaped laterally. This method of charging, however, is not applicable without danger to the known conveyers for glass sheets, whether such conveyers be of the parallel slat type or of the endless belt type.

With conveyers of the first mentioned type, which are formed of an endless apron made of parallel slats secured to endless chains driven by toothed gearing, the sheets to be conveyed cannot be allowed to drop thereon without running the risk of frequent accidents; it is therefore necessary to lay them thereon with great care. As to the conveyers of the second type, which comprise an endless belt carried by pulleys, their use gives rise to difficulties due to the fact that the belt tends to creep sidewise when it is of a substantial width, corresponding to the size of the sheets to be conveyed; the belt moreover sags between its bearing points and this impairs the uniformity of its forward movement.

In accordance with the present invention these various inconveniences are avoided by constituting the conveyer of two or more narrow endless belts in parallel relation, which are driven in synchronism by pulleys and rest with their working portion on a flat supporting surface on which they are adapted to slide. This surface, provided for example on a table, may be fitted with guides in order to prevent lateral creeping of the belts, said guides advantageously comprising grooves provided to that end in the table surface. It is also advisable to fix to the table, abutments for accurately determining the position of the glass sheets relatively to the conveyer both longitudinally and transversely thereof.

The term "narrow belts" is to be understood herein as applying to conveyer belts whose width does not exceed about one meter.

The accompanying drawing illustrates diagrammatically by way of example a constructional embodiment of the conveyer according to this invention, Fig. 1 being a longitudinal section thereof,
Fig. 2 a partial cross-sectional view on a larger scale, on line II—II of Fig. 3, and
Fig. 3 a plan view.

The conveyer comprises a series of parallel narrow belts 1 driven in synchronism by pulleys 2, 3 and adapted to slide with their working portion on the table 4. This table is provided with openings 5 for letting in the belts 1 which are provided with tensioning means 6. In alignment with the openings 5 are grooves 7 in the surface of the table to guide the belts along a rectilinear path, the depth of said grooves and the thickness of the belts being so determined that the upper surface of the belts projects above the table only by a small distance just sufficient to prevent contact between the glass sheet and the table.

It has been found that under these conditions, a glass sheet as $a$ may be dropped forward from its full height about one of its edges without breaking, even if the belts are spaced widely apart, provided the supporting table be substantially continuous, so that the air driven by the falling sheet can only escape laterally.

In order that the falling sheets shall take up a strictly defined position on the conveyer, the table is provided with side abutments 8 which determine the position of the sheets in the transverse direction and end abutments 9 which determine the position in the longitudinal direction. These latter abutments also check any tendency of the sheet to shoot backwards at the moment its rear edge is lifted by the flux of air forcibly driven by the sheet towards its periphery just before it touches the conveyer. To that end it is only necessary to cause the lower edge of the glass sheet to bear against said abutments 9 before the sheet is allowed to fall. The position of the falling sheet, just as it is about to touch the conveyer, is shown at $a'$ in dot and dash lines.

It is thus possible to charge easily and with great speed successive sheets of glass on the conveyer by merely standing them on one of their edges and allowing them to drop freely.

Modifications may of course be made in the example described without departing from the scope of the invention. Thus instead of extending through the table, the belts may extend over the entire length thereof, but this arrangement would be less advantageous, as by placing the successive sheets with their edges on the conveyer the belts which project over the table are liable to be damaged. This inconvenience is avoided by causing the belts to emerge from the table at points which, as shown, are situated forwardly of the position line.

I claim:

1. An apparatus for loading and conveying glass sheets comprising a table having a flat surface impervious to air extending from one longitudinal edge of said table to the other, the rear portions of said table forming a short platform defining a loading station to receive successive glass sheets standing on edge, said surface having horizontally spaced, longitudinally extending grooves formed therein, said grooves extending forwardly from locations in advance of said platform, openings being provided at the ends of said grooves adjacent said platform, uninterrupted flat endless belts of flexible material extending through said openings and slidably disposed in said grooves, the thickness of said belts being greater than the depth of said grooves, thereby to define a cushioning air space between adjacent belts limited by the surface of said table and the portions of the side walls of said adjacent belts extending above said surface.

2. An apparatus as claimed in claim 1 having means at the rear of said platform for guiding the lower edge of a glass sheet standing on said platform and allowed to fall forwardly on said surface.

3. An apparatus as claimed in claim 1, having abutments along the rear edge of said platform, said abutments being of sufficient height to prevent the rear edge of a standing glass sheet from moving backward as it falls onto said belts.

EDGARD BRICHARD.

REFERENCES CITED

The following references are of record in the file of this patent:

UNITED STATES PATENTS

| Number | Name | Date |
|---|---|---|
| 1,480,875 | Bartlett | Jan. 15, 1924 |
| 1,714,721 | Mojonnier | May 28, 1929 |
| 1,781,750 | Dodge et al. | Nov. 18, 1930 |
| 1,868,538 | McKee et al. | July 26, 1932 |
| 1,871,220 | McLeod | Aug. 9, 1932 |
| 2,265,028 | De Croce | Dec. 2, 1941 |

FOREIGN PATENTS

| Number | Country | Date |
|---|---|---|
| 290,241 | Great Britain | Dec. 6, 1928 |